(12) United States Patent
Abercrombie

(10) Patent No.: US 6,527,288 B2
(45) Date of Patent: Mar. 4, 2003

(54) MUD FLAP ATTACHMENT DEVICE

(76) Inventor: Robbie Abercrombie, 1165 Fords Lake Pl., Acworth, GA (US) 30101

( * ) Notice: Subject to any disclaimer, the term of this patent is extended or adjusted under 35 U.S.C. 154(b) by 0 days.

(21) Appl. No.: 09/824,266

(22) Filed: Apr. 2, 2001

(65) Prior Publication Data

US 2002/0140199 A1 Oct. 3, 2002

(51) Int. Cl.$^7$ ............................................. B62D 25/18
(52) U.S. Cl. ...................................... 280/154; 280/851
(58) Field of Search .................... 248/289.11; 280/848, 280/851, 154

(56) References Cited

U.S. PATENT DOCUMENTS

| | | |
|---|---|---|
| 938,057 A | 10/1909 | Jay |
| 1,015,068 A | 1/1912 | Pulit |
| 1,513,167 A | 10/1924 | Fleming |
| 2,826,428 A | 3/1958 | Lincoln ................... 280/154.5 |
| 3,195,920 A | 7/1965 | Knisely et al. .......... 280/154.5 |
| 3,219,363 A | 11/1965 | Dalsey et al. ........... 280/154.5 |
| 3,549,171 A | 12/1970 | Katz ....................... 280/154.5 |
| 3,778,086 A * | 12/1973 | Moore et al. ......... 280/154.5 R |
| 3,877,722 A * | 4/1975 | Conner ...................... 280/154 |
| 3,899,193 A | 8/1975 | Evans .................... 280/154.5 |
| D362,226 S | 9/1995 | Sacks et al. ............... D12/185 |
| 5,460,412 A * | 10/1995 | Vincent et al. ............. 280/851 |
| D398,570 S | 9/1998 | Bollman .................... D12/185 |
| 5,915,708 A * | 6/1999 | Silva .......................... 280/154 |
| 6,102,437 A | 8/2000 | McLane .................. 280/763.1 |
| 6,116,628 A | 9/2000 | Adrian ....................... 280/154 |
| 6,186,527 B1 * | 2/2001 | Monhollen et al. ......... 280/154 |

* cited by examiner

*Primary Examiner*—Avraham Lerner
(74) *Attorney, Agent, or Firm*—Thomas, Kayden, Horstemeyer & Risley, LLP

(57) ABSTRACT

The present mud flap attachment device provides an apparatus and method for attaching mud flaps to vehicles. An embodiment of the mud flap attachment device includes a first plate and a second plate. The first plate is configured for mounting to the vehicle and includes a plurality of flap supports configured to receive fasteners. The second plate is of lesser width than the first plate, includes a plurality of support apertures and is hingably attached to the first plate on one end. The plurality of support apertures are positioned such that when the apertures of a mud flap are placed over the flap supports, the second plate can be rotated into a position whereby the flap supports extend through the support apertures and the mud flap is positioned between the first and second plates. Fasteners are then used to engage the flap supports, thereby securely attaching the mud flap to the vehicle.

16 Claims, 3 Drawing Sheets

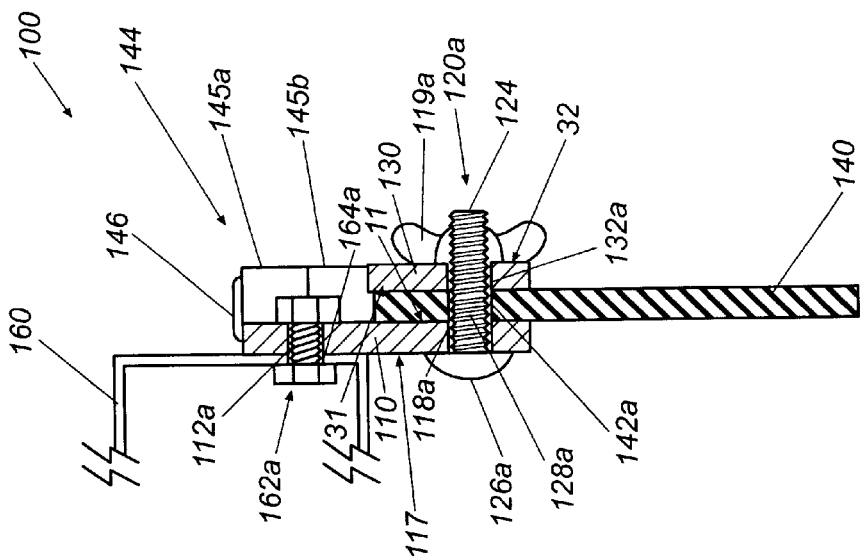

MUD FLAP ATTACHMENT DEVICE

TECHNICAL FIELD

The present invention generally relates to mud flaps for vehicles. More particularly, the invention relates to a device for attaching a mud flap to a vehicle.

BACKGROUND OF THE INVENTION

As is known, many large trucks and similar vehicles often have mud flaps positioned behind various wheel structures. The mud flaps not only prevent damage to other vehicles caused by rocks and other debris, they improve visibility for nearby vehicles by preventing excessive rain, snow, etc., spray from being created. For these reasons, quite often there are laws and ordinances requiring the use of mud flaps on certain vehicles, particularly large trucks. Failure to comply with these laws can lead to hazardous situations on the road as well as excessive penalties and fines for the operation of the vehicle without mud flaps.

The environments the above noted vehicles often operate in, and the functions they perform, can potentially lead to the damage or loss of mud flaps. For example, tractor trailers typically have to back into loading docks to unload and take on freight. The potential exists during this ingress and egress to have a mud flap become caught on various objects and subsequently lost or damaged. Similarly, operators of cement mixers, dump trucks, tow trucks, road pavers, etc., have similar concerns because they quite frequently operate in harsh environments and perform functions that lend themselves to damaging mud flaps.

Ideally, a damaged or lost mud flap should be replaced at the earliest opportunity. This is not only desirable from a safety standpoint, but also from an economical standpoint in that early replacement of the mud flap will reduce the likelihood of incurring fines for failure to comply with ordinances and regulations. Therefore the driver, rather than a maintenance person, is probably going to have to replace the mud flap when and where the damage or loss is discovered.

Presently there are mud flap mounting assemblies that allow mud flaps to be changed "in the field." However, these assemblies tend to require specially designed mud flaps or tools of some sort. These assemblies are inadequate in that the use of specially designed mud flaps is inconvenient and more costly, and the driver of the vehicle may not have access to the required tools.

From the foregoing, it can be appreciated that it would be desirable to have a simple, inexpensive, and effective mechanism for replacing mud flaps, thereby facilitating the safe operation of vehicles while reducing the potential of incurring the fines associated with the violation of safety regulations.

SUMMARY OF THE INVENTION

Briefly described, a mud flap attachment device provides an apparatus and method for attaching mud flaps to vehicles. An embodiment of the mud flap attachment device includes a bracket having a first plate and a second plate. The first plate is configured for mounting to the vehicle and includes a plurality of flap supports configured to receive fasteners. The second plate is of lesser width than the first plate, includes a plurality of support apertures and is hingably attached to the first plate on one end. The plurality of support apertures are positioned such that when the apertures of a mud flap are placed over the flap supports, the second plate can be rotated into a position whereby the flap supports extend through the support apertures and the mud flap is positioned between the first and second plates. Threaded fasteners are then used to engage the flap supports, thereby securely attaching the mud flap to the vehicle.

The mud flap attachment device can also be viewed as providing a method for securing a mud flap to a vehicle. In this regard, the method can be broadly summarized by the following steps: mounting a first plate on a vehicle that includes a plurality of flap supports configured to receive threaded fasteners; rotatably attaching a second plate that includes a plurality of support apertures formed therein to the first plate; hanging a mud flap from the flap supports by placing apertures formed in the mud flap over the flap supports; rotating the second plate into a position such that the flap supports pass through the support apertures and the mud flap is held between the first and the second plates; and securing the second plate in position, thereby securely attaching the mud flap to the vehicle.

Other systems, methods, features, and advantages of the present mud flap attachment device will be or become apparent to one with skill in the art upon examination of the following drawings and detailed description. It is intended that all such additional systems, methods, features, and advantages be included within this description, be within the scope of the mud flap attachment device, and be protected by the accompanying claims.

BRIEF DESCRIPTION OF THE DRAWINGS

The mud flap attachment device can be better understood with reference to the following drawings. The components in the drawings are not necessarily to scale, emphasis instead being placed upon clearly illustrating the principles of the mud flap attachment device. Moreover, in the drawings, like reference numerals designate corresponding parts throughout the several views.

FIG. 3 is a rear view of the mud flap attachment device as shown in FIG. 1, being used to securely attach a mud flap to a vehicle.

FIG. 4 is a side cross-sectional view of the mud flap attachment device along line 4—4 of FIG. 3.

Figure 1:
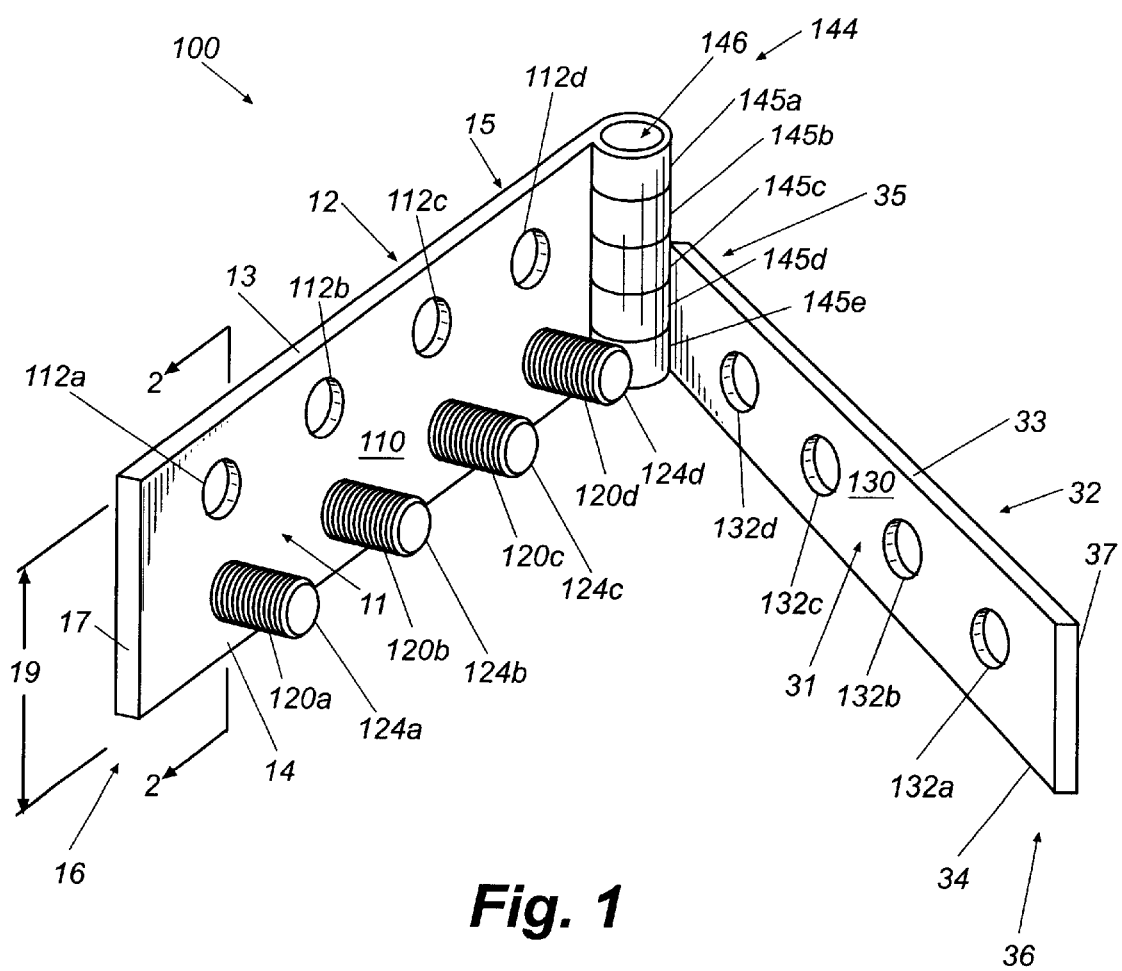
FIG. 1 is a top, side perspective view of an embodiment of the mud flap attachment device.

Reference will now be made in detail to the description of the mud flap attachment device as illustrated in the drawings. While the mud flap attachment device will be described in connection with these drawings, there is no intent to limit it to the embodiment or embodiments disclosed therein. On the contrary, the intent is to cover all alternatives, modifications and equivalents included within the spirit and scope of the mud flap attachment device as defined by the appended claims.

DETAILED DESCRIPTION OF THE PREFERRED EMBODIMENT

Referring now in more detail to the drawings, FIG. 1 illustrates an embodiment of a mud flap attachment device 100. As shown, the mud flap attachment device 100 resembles a bracket having a first plate 110 and a second plate 130 that are hingably attached through a hinge 144.

The first plate 110 has an inner surface 11, an outer surface 12, a top edge 13, a bottom edge 14, a connected (first) end 15, and a free (second) end 16 with a free edge 17. The second plate 130 has an inner surface 31, an outer surface 32, a top edge 33, a bottom edge 34, a connected (first) end 35, and a free (second) end 36 with a free edge 37. As shown, the first plate 110 includes mounting apertures 112 (112a, 112b, 112c, 112d). These mounting apertures 112 (112a, 112b, 112c, 112d) are used to secure the mud flap attachment device 100 to a vehicle, such as through bolts, for example. Virtually any other structure for attaching the mud flap attachment device 100 to the vehicle is also contemplated, such as welding, in which case the mounting apertures 112 (112a, 112b, 112c, 112d) are not necessary.

Figure 2A:
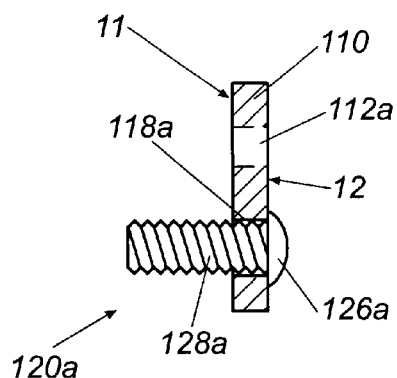
FIGS. 2A–2D are side cross-sectional views of the mud flap attachment device and associated flap support along line 2—2 of FIG. 1, revealing various alternative configurations for attachment of the flap supports.
Figure 2B:
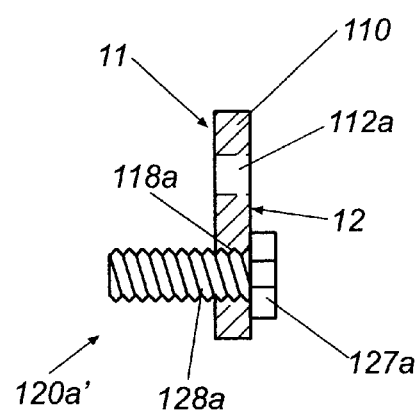
Figure 2C:
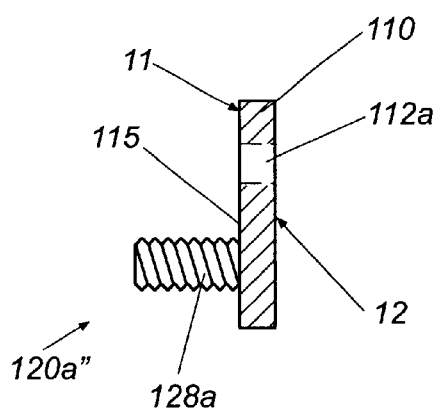
Figure 2D:
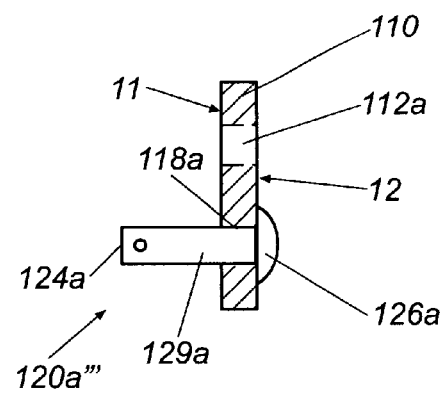

The first plate 110 also includes a plurality of flap supports 120 (120a, 120b, 120c, 120d). As shown, the flap supports 120 (120a, 120b, 120c, 120d) are threaded, however, other configurations are possible. FIGS. 2A–2D show a number of alternative structures, among others, for securely attaching the flap supports 120 (120a, 120b, 120c, 120d) to the first plate 110. FIG. 2A shows an embodiment based on an "ease of construction" basis. Flap support 120a is shown with a stud head 126 connected to a threaded stem 128a inserted in an orifice 118a formed in the first plate 110. The flap support 120a is secured in place by welding. FIG. 2B shows a flap support 120a' with a bolt head 127 having a threaded stem 128a mounted in orifice 118a. However, both the threaded stem 128a and the orifice 118a are threaded, thereby negating the need to weld the flap support 120a' in place. FIG. 2C shows a flap support 120a" with a threaded stem 128a like those noted above, welded (or integrally formed) to the inner surface 11 of the first plate 110, in which case no orifices 118 are required in the first plate 110. The flap supports 120 (120a, 120b, 120c, 120d) need not be threaded as they are in the previous examples. FIG. 2D shows a flap support 120a'" with a stud head 126 and a smooth stem 129a passing through the orifice 118a in the first plate 110 and welded in place. Note the distal end 124a (like the other ends 124b, 124c, 124d, not shown) is configured in this alternative embodiment to receive a fastening means other than a threaded fastener, for example a cotter pin. Many other structures that protrude from the inner surface 11 of the first plate 110 are also considered to be within the scope of the present invention, as would be understood by one skilled in the art.

Referring back to FIG. 1, the second plate 130 includes a plurality of support apertures 132 (132a, 132b, 132c, 132d) formed therein. The support apertures 132 (132a, 132b, 132c, 132d) are positioned such that when the second plate 130 is rotated to a position adjacent the first plate 110, the distal ends 124 (124a, 124b, 124c, 124d) of the flap supports 120 (120a, 120b, 120c, 120d) pass therethrough. In the embodiment shown, the four flap supports 120 (120a, 120b, 120c, 120d), and subsequently the support apertures 132 (132a, 132b, 132c, 132d), are spaced so that mud flaps 140 (FIGS. 3 and 4) having a standard configuration of mounting orifices 142 (spaced approximately 7 inches apart) may be used with the bracket. Of course, other arrangements of mounting orifices 142 are included within the scope of the present invention.

As mentioned, the first plate 110 and second plate 130 are hingably attached at the connected (first) ends 15, 35. As shown, this particular embodiment includes a standard hinge 144 as would be found on a door. The hinge 144 includes interlocking cylindrical fingers 145 (145a, 145b, 145c, 145d, 145e) with a rod 146 passing therethrough to rotatably secure the first and second plates 110, 130 together. As shown, interlocking finger 145d is attached (or integrally formed) to the first plate 110 while interlocking fingers 145a, 145c and 145e are attached (or integrally formed) to the second plate 130. In the present configuration, 145b is not attached to either plate, and interlocking fingers 145a and 145b do not actually serve to join the first and second plates 110, 130 together. This is because, from an "ease of construction" standpoint, a hinge 144 that is the full height 19 (FIG. 1) of the first plate 110 was chosen. Note, however, hinges 144 of varying lengths and having varying numbers of interlocking fingers 145 are within the scope of the present invention. In fact, practically any suitable means for rotatably attaching the first plate 110 and second plate 130 is within the scope of invention for this mud flap attachment device 100. For example, a conventional pin and channel structure is another possible structure for rotatably connecting the plate.

OPERATION

Replacement of a mud flap 140 attached to a vehicle using an embodiment of the mud flap attachment device 100 will now be discussed. FIG. 3 is a rear view of the mud flap attachment device 100 as used to attach a mud flap 140 to a vehicle 160, and FIG. 4 is a side view of the mud flap attachment device 100 along line 4—4 of FIG. 3. In FIGS. 3 and 4, the mud flap attachment device 100 is mounted to a vehicle 160 with four connectors 162 (162a, 162b, 162c, 162d) engaging mounting orifices 164 (164a shown in FIG. 4), formed therein. As shown, the connectors 162 (162a, 162b, 162c, 162d) include a typical nut and bolt arrangement. However, as previously noted, various means of mounting the mud flap attachment device 100 are envisioned, such as welding, which would negate the need for the connectors 162 (162a, 162b, 162c, 162d). The mud flap attachment device 100 can be mounted to a vehicle with a hingably attached end 102 disposed either toward or away from a longitudinal axis (not shown) of a vehicle 160, of which a mount is shown. As shown in FIG. 3, the hingably attached end 102 is oriented toward the longitudinal axis. Although identical mud flap attachment devices 100 can be used on each side of the vehicle, it is preferable to use mud flap attachment devices 100 that are mirror images of each other. This allows both mud flap attachment devices 100 to be mounted to the vehicle with the hingably attached end 102 toward the longitudinal axis of the vehicle. This is desirable in that during replacement of a mud flap 140, the second plate 130 will be rotated inward, toward the longitudinal axis of the vehicle rather than toward the side of the vehicle and potentially into nearby traffic. Of course, the reverse arrangement is also envisioned in some embodiments, as is mounting on a front or rear side of a vehicle mounting surface, depending on vehicle configuration.

Removal of the torn or damaged mud flap 140 requires the removal of fasteners, in this case wing nuts 119. Threaded wing nuts 119 are used in one embodiment so the person changing the mud flap 140 may remove and install the wing nuts 119 without any additional tools. As previously mentioned, a driver may want to change the mud flap 140 in a location where no tools are accessible. Four wing nuts 119 are shown, however, the mud flap 140 could be securely held in place with a lesser number. Likewise, other numbers of flap supports 120 (120a, 120b, 120c, 120d) are contemplated.

Once the wing nuts 119 have been removed, the second plate 130 is rotated to a position allowing removal of the mud flap 140 (FIG. 1). Hingably attaching the first plate 110 and the second plate 130 offers the advantage of reducing the chances of losing parts of the bracket. This is very important because replacement of the mud flap 140 may occur under adverse conditions such as rain, darkness, or on the shoulder of a busy roadway.

After the damaged mud flap 140 has been removed, the mounting orifices 142 (142*a* shown in FIG. 4) of the replacement mud flap 140 are placed over the flap supports 120 (120*a*, 120*b*, 120*c*, 120*d*). Next, the second plate 130 is rotated into position such that the distal ends 124 (124*a*, 124*b*, 124*c*, 124*d*) of the flap supports 120 (120*a*, 120*b*, 120*c*, 120*d*) protrude through the support apertures 132 (132*a*, 132*b*, 132*c*, 132*d*) and the mud flap 140 is "sandwiched" between the opposing inner surfaces 11, 31 of the first and second plates 110, 130. Finally, as shown in FIG. 4, the distal ends 124 (124*a*, 124*b*, 124*c*, 124*d*) of the flap supports 120 (120*a*, 120*b*, 120*c*, 120*d*) are engaged with the fasteners. In the instant case, that entails securing the second plate 130 in position by hand with wing nuts 119. As previously stated, the use of other fasteners is possible, such as threaded nuts, cotter keys, etc. However, for ease of replacing the mud flaps 140, threaded wing nuts 119 are preferred.

It should be emphasized that the above-described embodiments of the present mud flap attachment device 100, particularly, any "preferred" embodiments, are merely possible examples of implementations, merely set forth for a clear understanding of the principles of the mud flap attachment device 100. Many variations and modifications may be made to the above-described embodiment(s) of the mud flap attachment device 100 without departing substantially from the spirit and principles of the mud flap attachment device 100. All such modifications and variations are intended to be included herein within the scope of this disclosure and the present mud flap attachment device 100 and protected by the following claims.

Therefore, having thus described the mud flap attachment device, at least the following is claimed:

1. A mud flap attachment device for attaching a mud flap to a vehicle, comprising:
    a first plate configured for mounting to the vehicle, including a first end, a second end, and a plurality of flap supports disposed thereon configured to receive a plurality of fasteners; and
    a second plate including a first end, a second end, and a plurality of support apertures formed therein, said first end of said second plate being hingably connected to said first end of said first plate, said plurality of support apertures being configured such that said flap supports extend therethrough when said second plate is rotated into close proximity of said first plate, and said second plate is secured in close proximity to said first plate by engaging said plurality of flap supports with said plurality of fasteners, whereby said plurality of flap supports both support the mud flap and secure said second plate in close proximity to said first plate.

2. The device as claimed in claim 1, wherein said second plate is of lesser width than said first plate.

3. The device as claimed in claim 1, wherein said plurality of fasteners are threaded.

4. The device as claimed in claim 1, said first plate further includes a first plurality of apertures configured to mount said first plate to the vehicle.

5. The device as claimed in claim 1, wherein said plurality of flap supports are threaded and said plurality of fasteners is a plurality of threaded wing nuts.

6. The device as claimed in claim 5, said first plate further including a second plurality of apertures configured to receive said plurality of flap supports.

7. The device as claimed in claim 6, said plurality of flap supports further comprising a plurality of threaded bolts rigidly secured to said first plate.

8. The device as claimed in claim 7, said second plurality of apertures comprising a plurality of threaded apertures configured to be threadably engaged by said plurality of threaded bolts.

9. The device as claimed in claim 3, wherein said plurality of flap supports are threaded and said plurality of fasteners is a plurality of threaded nuts.

10. A mud flap attachment device for attaching a mud flap to a vehicle, comprising:
    a first plate configured for mounting to the vehicle, including a first end, a second end, and means for vertically supporting the mud flap;
    a second plate including a first end, a second end, a plurality of support apertures formed therein, and means for rotatably connecting said first and second plates, wherein each support aperture of said plurality of support apertures is configured to allow said means for vertically supporting the mud flap to extend therethrough when said second plate is rotated into a position adjacent said first plate; and
    means for securing said second plate in said adjacent position and configured to engage said means for vertically supporting the mud flap, whereby said means for vertically supporting the mud flap both support the mud flap and secure said second plate in said adjacent position.

11. The device as claimed in claim 10, wherein said means for securing said second plate in said adjacent position includes a plurality of wing nuts.

12. A method for securing a mud flap to a vehicle, comprising the steps of:
    mounting a first plate on a vehicle with a plurality of flap supports disposed thereon and rotatably attached to a second plate including a plurality of support apertures;
    hanging a mud flap including a plurality of flap apertures formed therein from said plurality of flap supports, wherein said plurality of flap apertures are passed over said flap supports;
    rotating said second plate into a position wherein said plurality of flap supports pass through said plurality of support apertures, thereby exposing a plurality of end portions of said plurality of flap supports; and
    securing said second plate in said position by engaging said plurality of end positions with a plurality of fasteners, thereby securely attaching the mud flap to the vehicle.

13. The method of claim 12, wherein the step of mounting said first plate on a vehicle further comprises bolting said first plate to a frame of the vehicle.

14. The method of claim 12, wherein the step of mounting said first plate on a vehicle further comprises welding said first plate to a portion of a frame of the vehicle.

15. The method of claim 12, wherein the step of securing said second plate in said position further includes threadably engaging said plurality of end portions of said plurality of flap supports with a plurality of threaded fasteners.

16. The method of claim 15, wherein said plurality of threaded fasteners is a plurality of wing nuts.

* * * * *